(12) United States Patent
Knight et al.

(10) Patent No.: US 7,721,002 B2
(45) Date of Patent: May 18, 2010

(54) SYSTEM AND METHOD FOR DATA SYNCHRONIZATION

(75) Inventors: Kenneth J. Knight, Redmond, WA (US); David J. Messner, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 993 days.

(21) Appl. No.: 11/427,690

(22) Filed: Jun. 29, 2006

(65) Prior Publication Data

US 2006/0242327 A1 Oct. 26, 2006

Related U.S. Application Data

(63) Continuation of application No. 09/388,829, filed on Sep. 1, 1999, now Pat. No. 7,181,539.

(51) Int. Cl.
*G06F 15/16* (2006.01)
(52) U.S. Cl. .................. 709/248; 709/208; 709/209; 711/119; 711/121; 711/137
(58) Field of Classification Search ............... 709/208, 709/209, 203, 248, 211, 214, 215; 711/119, 711/120, 121, 123, 124, 137
See application file for complete search history.

(56) References Cited

U.S. PATENT DOCUMENTS

| 5,689,688 | A | * | 11/1997 | Strong et al. ............... 713/375 |
| 5,774,660 | A | * | 6/1998 | Brendel et al. ............. 709/201 |
| 5,796,946 | A | * | 8/1998 | Sakon ....................... 709/248 |
| 5,860,096 | A | | 1/1999 | Undy et al. |
| 5,892,946 | A | | 4/1999 | Woster et al. |
| 5,923,855 | A | * | 7/1999 | Yamazaki ................... 709/248 |
| 5,958,019 | A | * | 9/1999 | Hagersten et al. ........... 713/375 |
| 6,405,219 | B2 | | 6/2002 | Saether et al. |
| 6,529,995 | B1 | * | 3/2003 | Shepherd ................... 711/114 |
| 7,181,539 | B1 | * | 2/2007 | Knight et al. ............... 709/248 |

\* cited by examiner

*Primary Examiner*—Moustafa M Meky
*Assistant Examiner*—Barbara N Burgess
(74) *Attorney, Agent, or Firm*—Lee & Hayes, PLLC (57) ABSTRACT

Data is synchronized among multiple web servers, each of which is coupled to a common data server. Each web server retrieves a scheduled activation time from the data server. If the current time is prior to the scheduled activation time, then each web server retrieves updated data from the data server into a staging cache in the web server. At the scheduled activation time, each web server copies data from its staging cache to an active cache in the web server. If a new web server is added or an existing web server is initialized, then data is copied from an active cache in the data server to an active cache in the new or initialized web server. The multiple web servers may be arranged to form a web farm.

19 Claims, 7 Drawing Sheets

Fig. 1

(Prior Art)

SYSTEM AND METHOD FOR DATA SYNCHRONIZATION

RELATED APPLICATION

This application is a continuation application of U.S. patent application Ser. No. 09/388,829, filed on Sep. 1, 1999. Priority is hereby claimed to this case under 35 U.S.C. Section 120.

TECHNICAL FIELD

This invention relates to data synchronization. More particularly, the invention relates to synchronizing multiple data caches contained in multiple servers using a central database.

BACKGROUND OF THE INVENTION

A variety of internet-based server applications require access to certain data. In situations where multiple servers are executing multiple instances of a particular server application, all instances of the server application require access to the same set of data. For example, a commerce-related server application requires access to a set of data containing information regarding product (or service) prices, shipping charges, and promotions or other discounts. If multiple servers are executing the same commerce-related server application, each instance of the application must access the same set of data to accurately and consistently calculate the price of a customer's order. If different instances of the commerce-related server application access different sets of data, different instances of the application may calculate different prices for the same order. To avoid this problem, it is important that all instances of a particular application access the same set of data or access different sets of synchronized data.

In a typical collection of web servers, referred to as a "web farm", a technique known as "DNS round-robin load balancing" is often used to distribute tasks among the multiple web servers. Using this technique, each web server in the web farm is assigned a unique internet protocol (IP) address. In this situation, a single internet site address is associated with a list of IP addresses (i.e., the unique IP addresses assigned to each web server in the web farm). When a client browser resolves an internet site address using a domain name service (DNS) lookup, the client browser receives the list of IP addresses associated with all web servers in the web farm. In response to the first request, the client browser selects one entry in the list as the starting point. The client browser then rotates through the list of addresses in a round-robin manner for each subsequent request. When the browser reaches the end of the list, the next request is retrieved from the beginning of the list. Thus, each time a web page associated with an instance of an internet-based application is accessed, the next web server in the web farm (i.e., the web server associated with the next IP address in the list of addresses) is used to provide the web page to the browser.

In the internet server application discussed above, all web servers in the web farm must access the same set of data regarding pricing, shipping, and discounts. If different web servers apply different sets of data, then the price of the customer's order may change with each new web page access. For example, a simple "web page refresh" command will cause the browser to retrieve the "refreshed" web page from the web server associated with the next IP address in the list. If the new web server applies a different set of data to determine pricing, shipping costs, and discounts, then the price displayed to the customer may change after the page is refreshed, even though the actual order has not changed. This situation is undesirable and may cause the customer to abandon the web site, thereby resulting in lost revenue (and possibly a lost customer) for the operator of the site.

Figure 1:
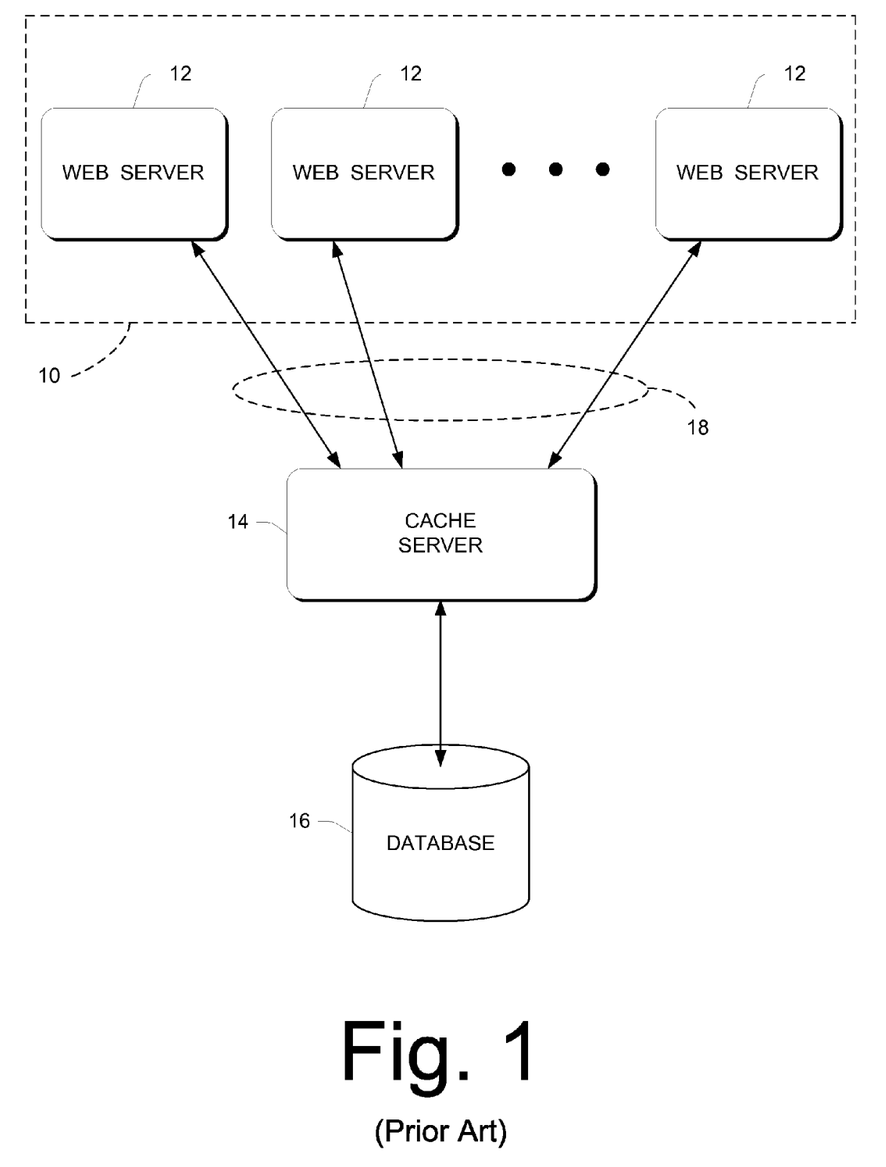
FIG. 1 illustrates a prior art system that allows multiple web servers to access data stored in a database through a cache server.

To ensure that all web servers access the same set of data, some existing systems use a two-tier approach of the type shown in FIG. 1, which allows multiple web servers to access data stored in a database through a cache server. FIG. 1 shows a web farm 10 comprised of multiple web servers 12. Each web server 12 is connected to a cache server 14, which is connected to a database 16. Web servers 12 are connected to cache server 14 through a local area network (LAN) 18. To access a particular set of data, one of the web servers 12 issues a data request across LAN 18 to cache server 14. Cache server 14 then retrieves the requested data from database 16 and provides the retrieved data across LAN 18 to the requesting web server 12. By providing a common database, each web server 12 accesses the same set of data when generating a web page.

Although the system of FIG. 1 ensures that each web server accesses a common set of data, the use of a single cache server 14 introduces a single point of failure. If cache server 14 fails, then all web servers 12 are prevented from accessing data contained in database 16. Furthermore, the system shown in FIG. 1 creates a significant amount of network traffic on LAN 18. Each time a web server 12 requests data from database 16, several messages (as well as the requested data) are sent across LAN 18 to satisfy the request. If the data requested by the web servers 12 does not change frequently, the web servers 12 may request the same data numerous times before the data in database 16 changes. This repeated transmission of data requests for the same data generates significant network traffic that is unnecessary if the data has not changed since the last data request. Additionally, if network traffic is heavy, the time required to retrieve data across LAN 18 may significantly delay the generation of a web page by web server 12. If data retrieval speed is important, then the delays associated with the system of FIG. 1 may prevent acceptable operation of web server 12.

SUMMARY OF THE INVENTION

The invention allows multiple web servers to cache data locally, while still maintaining data synchronization among themselves. This is accomplished without requiring any web server to have knowledge of the other web servers. Instead, each web server communicates with a common data server to retrieve data from a common database. In addition to storing data, the data server indicates a time at which the data should become active within each web server.

The data retrieved from the data server is initially stored by each web server in a local staging cache until reaching the synchronization time indicated by the data server. When the synchronization time arrives, all web servers copy the data from their staging cache to the active cache at approximately the same time. Thus, all web servers maintain the same set of active data although the web servers do not communicate with one another and are unaware of the other web servers.

An implementation of the invention synchronizes data among multiple web servers, each coupled to a common data server, by retrieving a scheduled activation time from the data server. If the current time is prior to the scheduled activation time, then each web server retrieves updated data into a staging cache in the web server. At the scheduled activation time, each web server copies data from its staging cache to an active cache in the web server.

Other aspects of the invention provide that after the scheduled activation time, the first web server to initiate a retrieval process updates data caches in the data server and calculates a next scheduled activation time.

In the described implementation of the invention, clock synchronization issues between the web servers and the data server are addressed by maintaining a time difference between the clock in the data server and the clock in each web server. This time difference is taken into account when each web server determines its next scheduled synchronization time.

In accordance with another aspect of the invention, the retrieval of updated data into staging caches in the plurality of web servers is performed asynchronously.

When a new web server is added to the multiple web servers, data is copied from an active cache in the data server to an active cache in the new web server.

DETAILED DESCRIPTION

Figure 2:
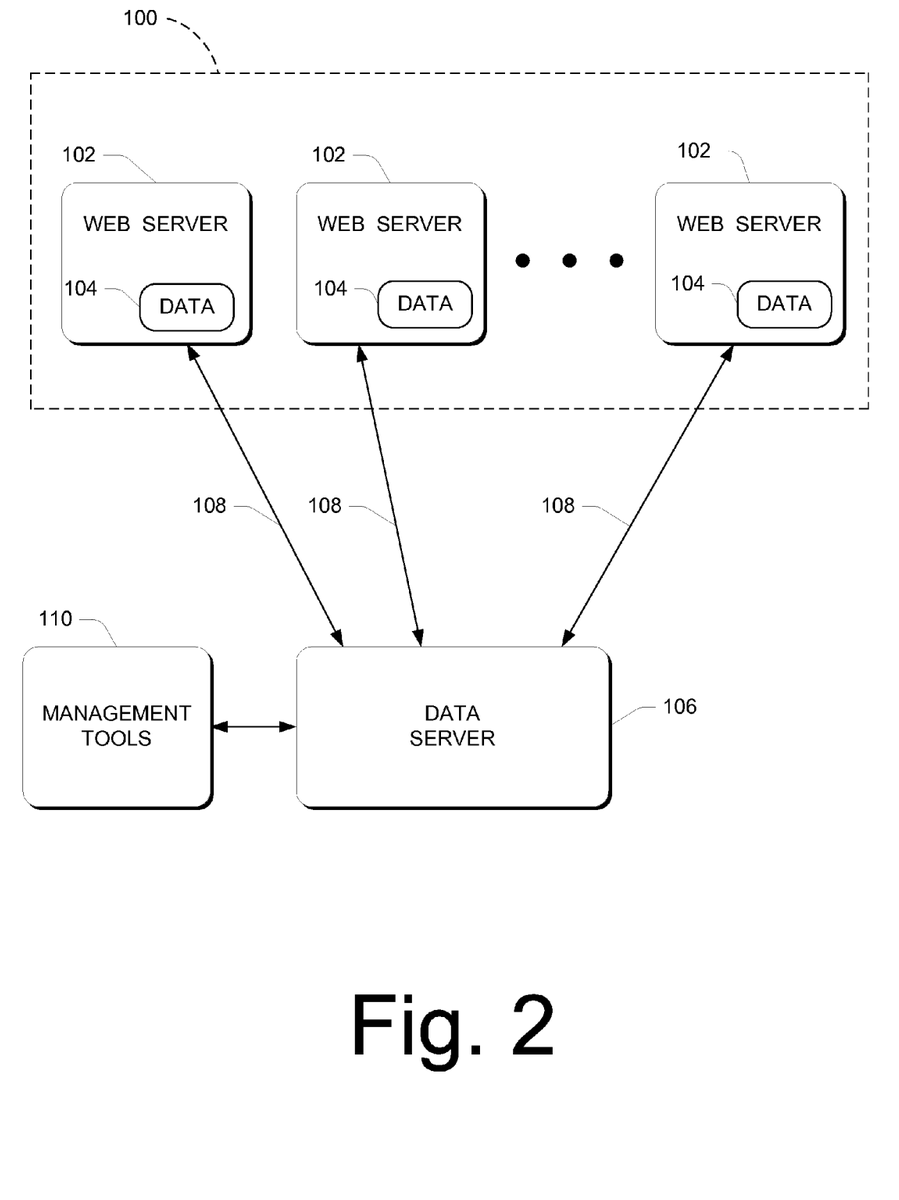
FIG. 2 illustrates an exemplary system that allows multiple web servers coupled to a data server to retrieve data from the data server.

FIG. 2 illustrates an exemplary system that allows multiple web servers coupled to a data server to retrieve data from the data server. The system includes a web farm 100, which comprises multiple web servers 102. The web farm 100 is accessed by one or more client computers, such as computers using internet browsers to access the web farm through the Internet. Multiple client computers can access the web farm 100 simultaneously, thereby allowing the users of the client computers to retrieve web pages from the web servers 102 simultaneously. For example, if each web server 102 is executing an internet-based electronic commerce application, then the users of the client computers can simultaneously access the web servers 102 in web farm 100 to shop for and purchase goods or services offered by the operator of the web site.

Each web server 102 maintains and accesses a set of cached data 104 when generating web pages and performing other tasks. By storing data locally in the web servers 102, each web server can quickly retrieve the data without waiting for network transfer times and other delays associated with retrieving data from a remote device. If numerous web servers 102 are repeatedly accessing data across the network, significant delays may result in the generation of web pages by the web servers. These delays are significantly reduced by the local caching of data within the web servers 102, thereby resulting in faster web page generation.

The web servers 102 are arranged and accessed using the DNS round-robin technique discussed above. Therefore, it is important that each web server 102 contain the same set of data 104 when generating web pages. Otherwise, the web pages may differ from one web server to the next (e.g., displaying different pricing information) even though the data (e.g., price and discount percentage) should not change from one web server to the next. As discussed above, if different web servers 102 access different data when generating web pages, a simple web page refresh operation may change the information displayed on the web page because a different web server generates the subsequent web page using different data. To avoid this situation, the present invention provides a mechanism for simultaneously synchronizing the various sets of data 104 among all web servers 102.

The web servers 102 are coupled to a data server 106 via communication links 108. In most cases, the communications links will be formed by local area network connections, although other types of communications might be utilized such as wide area network connections and dedicated computer-to-computer connections.

Data server 106 contains data and other information used by web servers 102 to generate web pages and to synchronize data at the appropriate time. Data server 106 thus acts as the central storage location for data that is to be retrieved by each web server 102. In one embodiment of the invention, data is stored in data server 106 using a SQL table or SQL database.

A set of management tools 110 are used to configure and manage the operation of data server 106 (e.g., manage the data that is copied from the data server to the web servers). Additionally, management tools 110 are able to set and modify various data values and other information stored within data server 106. The management tools also allow modification of the time between synchronization cycles. In the described embodiment, management tools 110 are programs that are executed on data server 106, although they could alternatively be executed from one of the web servers 102 or from another computer that has communications with data server 106.

Figure 3:
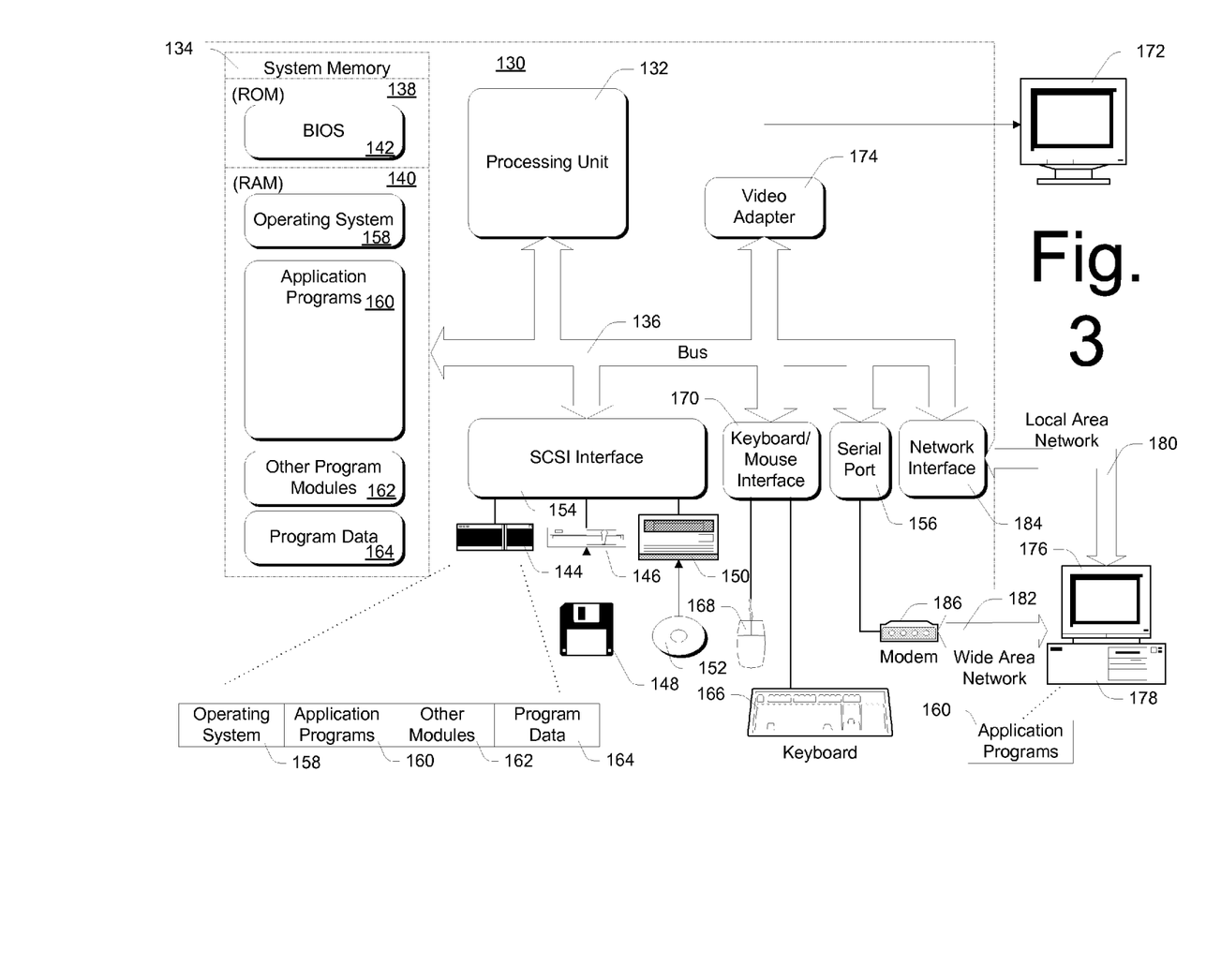
FIG. 3 is a block diagram showing pertinent components of a computer in accordance with the invention.

FIG. 3 shows a general example of a desktop computer 130 that can be used in accordance with the invention. A computer such as that shown in FIG. 3 can be used for any of the web servers 102 or data server 106.

Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 3. The logical connections depicted in FIG. 3 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Figure 4:
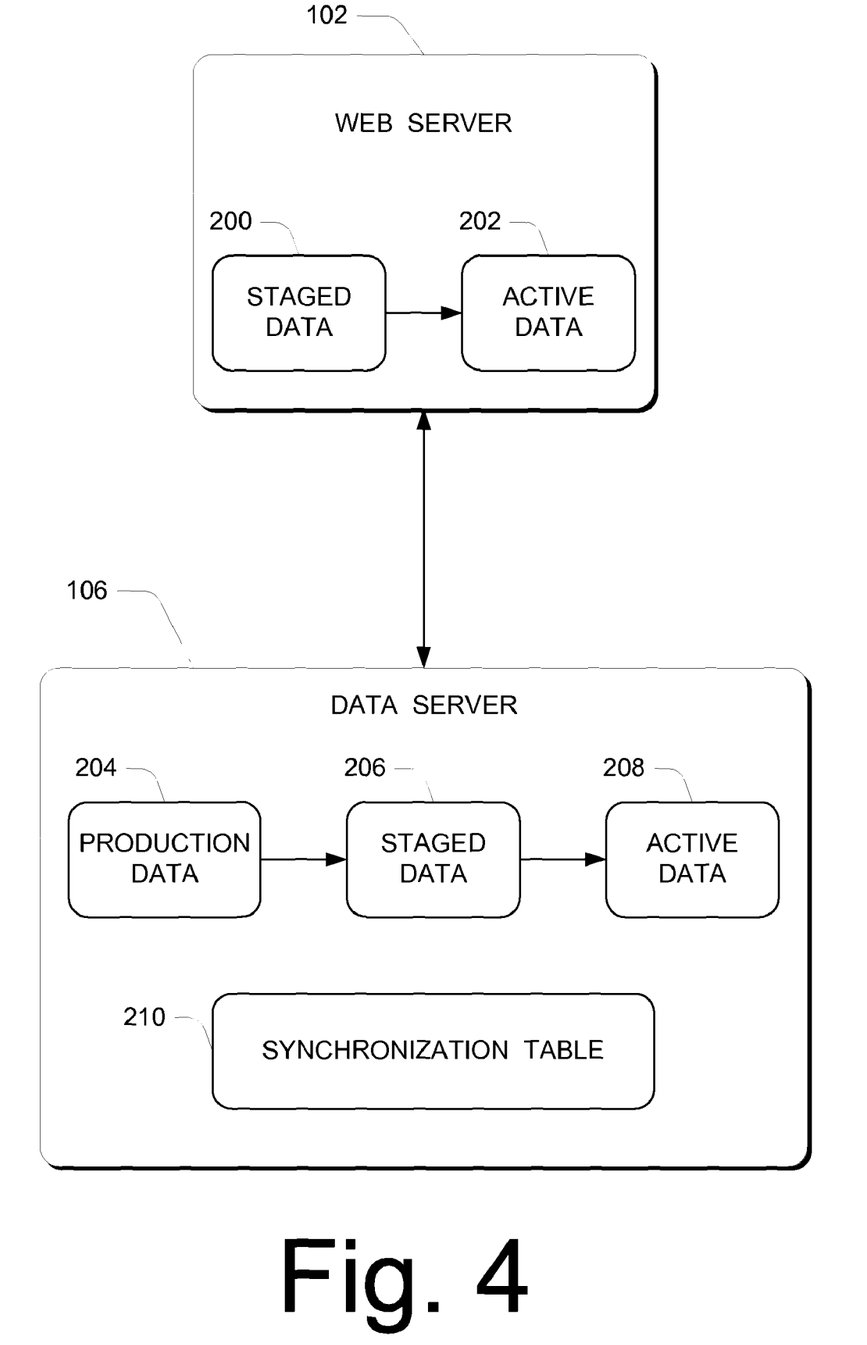
FIG. 4 is a block diagram illustrating pertinent components of a web server and a data server in accordance with the invention.

FIG. 4 is a block diagram illustrating pertinent components of one of the web servers 102 and the data server 106 in accordance with the invention. The web server 102 includes a staged data cache 200 and an active data cache 202. Active data cache 202 contains current data that web server 102 is currently using to generate web pages and perform other tasks. The active data caches 202 of all web servers 102 in the web server farm contain the same set of data, so that all web servers use the same data to generate the same web page. The staged data cache 200 contains data that will eventually become the current data, either by being copied into the active data cache 202 or by designating the staged data cache as the active data cache. As discussed in greater detail below, each web server 102 in the web farm copies the data from its staged data cache 200 to its active data cache 202 at the same time, such that the active data in all web servers 102 remains synchronized.

Data server 106 includes a production data cache 204, a staged data cache 206, and an active data cache 208. The production data cache 204 stores data being created or modified using one or more management tools 110. The data stored in cache 204 may not be complete and is not necessarily ready for use in generating web pages. Production data cache 204 may also store data that is scheduled to be activated at a particular date and time. This scheduled data is stored in the production data cache 204 until the scheduled time has occurred or will occur in the near future (e.g., within the next ten minutes), at which time the data is copied to the staged data cache 206, as discussed below.

The staged data cache 206 contains a copy of updated data after all modifications have been performed in production data cache 204. This is data that will eventually become the current data, for consumption by the web servers 102. The active data cache 208 contains the actual data that is provided to individual web servers upon request. As will be described in more detail below, the web servers request the data in prearranged synchronization cycles. Whenever the staged data cache of the data server contains updated data, this data is copied to the staged data cache 200 of the web server during the first phase of each synchronization cycle. All web servers copy data from their staged data cache 200 to their active data cache 202 at the next scheduled activation time, such that all web servers begin using the same updated data at approximately the same time.

Data server 106 also includes a synchronization table 210. The synchronization table 210 includes information relating to the date and time of an upcoming data synchronization cycle. Synchronization table 210 also includes information regarding the desired time intervals between data synchronization cycles. For example, the table might indicate that web servers 102 are to perform a data synchronization cycle every ten minutes.

Each synchronization cycle includes two phases: a retrieval phase and an activation phase. During the retrieval phase, each web server 102 queries the data server 106 for a fresh copy of data from the staged data cache 206 of the data server. This data is written to the staged data cache 200 of the individual web servers 102. Because the retrieved data does not immediately become active (it is not immediately put into the active data cache of the web server), it is not necessary for the retrieval operations to be closely synchronized between the individual web servers. Thus, the retrieval phase is an asynchronous process.

The activation phase comprises "activating" the data that was previously retrieved from staged data cache 206 of the data server. This involves, for each web server 102, either copying the contents of staged data cache 200 to active data cache 202, or switching the designations of the two caches so that the staged data cache now becomes the active data cache. This activation step is performed by all web servers at a single prearranged time. Thus, the activation phase is a synchronous process. The retrieval phase is performed at defined intervals.

Figure 5:
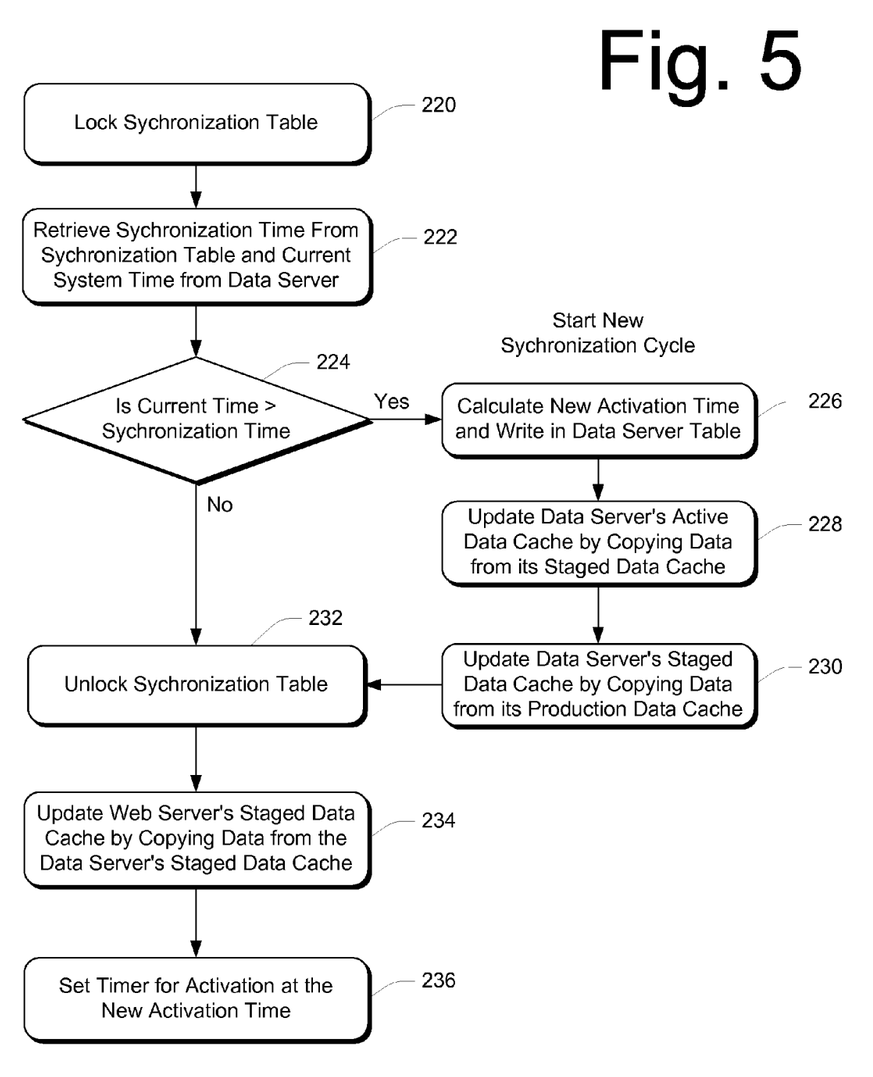
FIG. 5 is a flow diagram illustrating an exemplary procedure performed by each web server during the retrieval phase of each data synchronization cycle.

FIG. 5 is a flow diagram illustrating an exemplary procedure performed by each web server 102 during the retrieval phase of each data synchronization cycle. The retrieval phase represents the start of a new synchronization cycle and follows the activation phase of the previous synchronization cycle. The procedure of FIG. 5 is triggered when the previous activation phase is complete (i.e., the activation time has passed).

At step 220, the web server executing the procedure locks the synchronization table 210, thereby preventing other web servers from accessing the data server while the current web server is retrieving, and possibly modifying, data stored in the data server. This locking of the data server prevents two web servers from attempting to simultaneously modify the same data in the data server. Additionally, locking the data server prevents more than one web server from initiating the next synchronization cycle and ensures a consistent view of the data for all web servers.

The web server continues the procedure by retrieving the synchronization time from the synchronization table and retrieving the current system time from the data server (step 222). At step 224, the web server compares the current time to the synchronization time. If the current time is greater than the synchronization time (i.e., the synchronization time has passed), then the procedure branches to step 226, which marks the beginning of a new synchronization cycle.

At step 226, the web server calculates a new activation time by adding a predefined synchronization interval to the previous activation time. The synchronization interval is retrieved by the web server from the synchronization table 210 in the data server. An example equation for this calculation:

activation_time=activation_time+syncronization_interval

The new activation time is stored in the synchronization table 210 in the data server. The newly calculated activation time corresponds to the time of the next activation phase—the time at which each of the web servers 102 will next copy data from the web server's staged data cache 200 to the web server's active data cache 202. Since each of the web servers will retrieve this new activation time from the synchronization table, each of the web servers will update their active data cache at approximately the same time.

Step 228 comprises updating the data server's active data cache 208 by copying data from its staged data cache 206 to the active data cache. Step 230 comprises updating the data server's staged data cache 206 by copying data from its production data cache 204 to the staged data cache. Thus, steps 226-230 set the new (i.e., next) activation time and update the caches in the data server 106. The procedure continues to step 232 to unlock the synchronization table, thereby allowing other web servers to access the synchronization table, which now contains the new activation time.

Since the new activation time (established in step 226) has not yet occurred, all subsequent web servers that perform the procedure of FIG. 5 will continue from step 224 to step 232 to unlock the synchronization table.

Thus, it is only necessary for one web server to update the activation time (step 226) and update the data server caches (steps 228 and 230) during each synchronization cycle. These updates are performed by the first web server to execute the procedure of FIG. 5 after the previous synchronization cycle has finished. After the first web server has performed steps 226-230, each subsequent web server that executes the procedure of FIG. 5 during the same synchronization cycle only needs to retrieve the updated data from the data server (step 234).

At step 234, each web server (including the web server that performed steps 226-230) updates its staged data cache 200 by copying data from the data server's staged data cache 206 to the web server's staged data cache. At step 236, the web server executing the procedure sets an internal timer or similar mechanism to trigger at the new activation time. Each web server repeatedly attempts to perform the procedure of FIG. 5 until it is successful (i.e., until the web server has copied the appropriate data into its staged data cache 200 and retrieved the new activation time).

The web servers have a period of time equal to the synchronization interval value to copy data from the data server's staged data cache 206 to the web server's staged data cache 200. To ensure that all web servers will have time to update their staged data, the synchronization interval should be greater than the worst-case time to copy the data from data server 106 to each web server 102. In an exemplary embodiment, the synchronization interval is ten minutes.

The clocks in the various web servers 102 and the data server 106 are not required to be synchronized. Instead, each web server compares its clock value to the clock value of the data server and maintains a time difference between the clock in the data server and the clock in the web server. This time difference is taken into account when each web server determines its next scheduled synchronization time. The clocks in web servers 102 may have different values based on different time zones or differences resulting from using different time sources to set the clocks on the web servers.

To ensure that all web servers 102 copy data simultaneously, each web server periodically identifies the time contained in the data server's clock. The web server then calculates the time difference between the data server's clock and the web server's clock. This difference is recorded by the web server and is used in all subsequent clock comparisons or calculations, such as comparing the web server's clock to the activation time.

Figure 6:
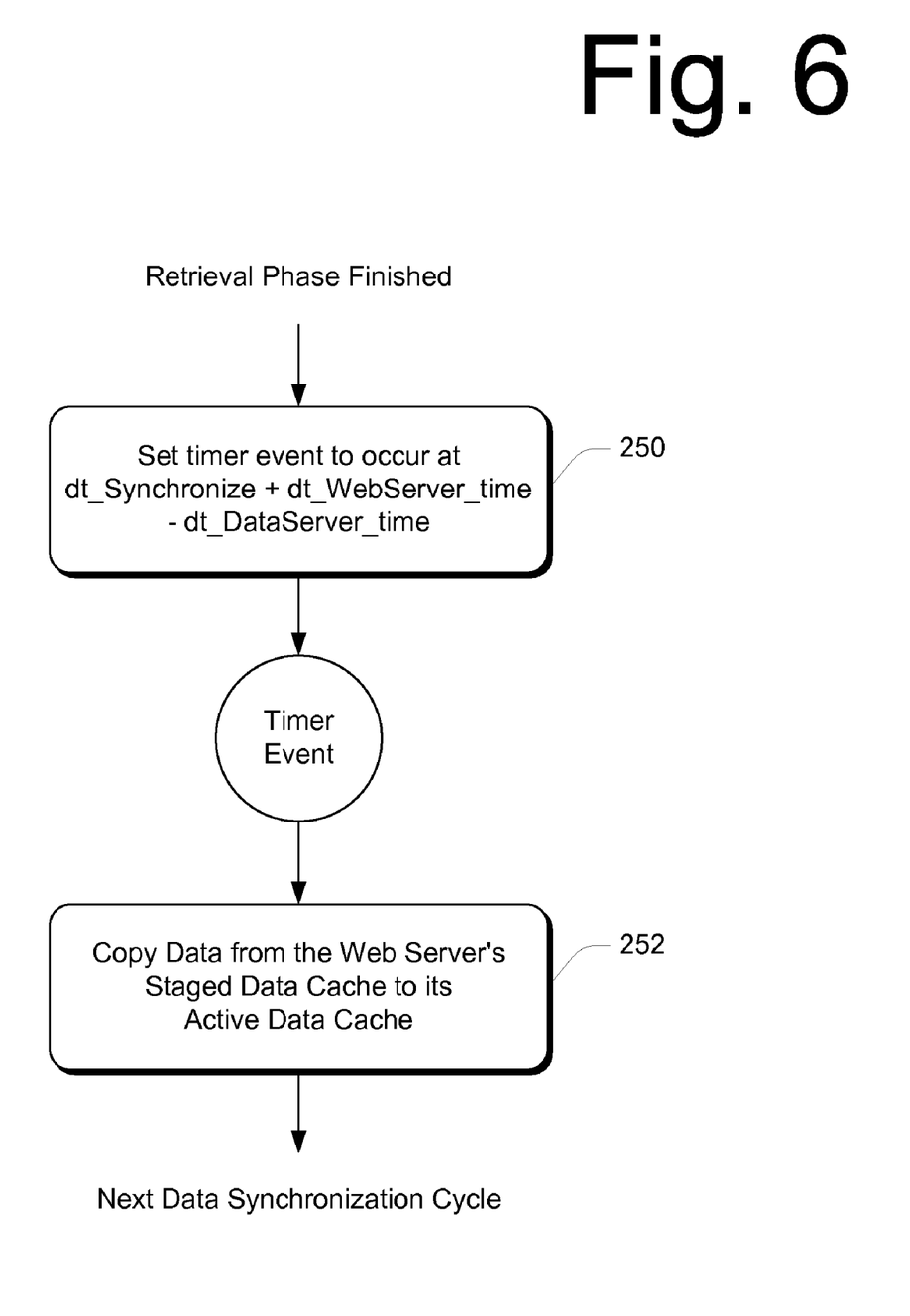
FIG. 6 is a flow diagram illustrating an exemplary procedure performed by each web server to identify the next activation time and implement the activation phase of the data synchronization cycle.

The second phase of the synchronization cycle is referred to as the activation phase, which begins at the activation time. After the retrieval phase has finished, the procedure illustrated in FIG. 6 is initiated. FIG. 6 illustrates an exemplary procedure performed by each web server to identify the next activation time and implement the activation phase of the data synchronization cycle. Step 250 comprises the web server setting a timer event to occur at a particular time, defined by:

timer event=$dt$_Activation_time+$dt$_WebServer_time–$dt$_DataServer_time

Where dt_Activation time is the date and time of the next scheduled activation, dt_WebServer_time is the date and time according to the clock in the web server, and dt_DataServer_time is the date and time according to the clock in the data server. Subtracting the data server time from the web server time determines the difference between the two clocks. This difference is then applied to (i.e., added to) the next scheduled activation time. Each web server calculates the timer event in the same manner, thereby causing the timer event to occur at approximately the same instant in time on all web servers.

Once the activation time has arrived (i.e., the timer event occurs), each web server copies data from its staged data cache to its active data cache (step 252), thereby overwriting the data previously stored in the active data cache. The updating of the active data cache is the last process performed in the data synchronization cycle. Once the active data cache update is complete, a new data synchronization cycle is started.

When the activation phase is complete (i.e., all web servers have copied data from their staged data cache to their active data cache), the synchronization cycle is complete. The next synchronization cycle begins when the first web server initiates the retrieval phase, as discussed above. The synchronization cycles continue by alternating between retrieval phases and activation phases.

In the embodiment discussed above, data is copied from the web server's staged data cache to its active data cache when the activation time arrives. In another embodiment of the invention, instead of copying data from the staged data cache to the active data cache, the web server swaps the active data cache pointer with the staged data cache pointer. In this situation, the previous staged data becomes the active data, as with the embodiment discussed above. In certain data processing environments, the swapping of the cache pointers is faster than copying data from one cache to another.

If a new web server is coupled to the data server, then the active data cache 202 in the web server is initialized. This initialization is performed by copying data from the active data cache 208 in the data server 106 into the active data cache 202 in the new web server. This allows the new web server to begin operation immediately using current data rather than waiting for data to be copied into the web server's active data cache 202 during the next data synchronization cycle. A similar procedure is used if an existing web server is reset or was temporarily disconnected from the data server.

Thus, each web server 102 is responsible for copying data from its own staging cache to its active cache at the appropriate time. A separate cache server or similar device is not required to coordinate the synchronization of data among the multiple web servers 102. The configuration of the present invention reduces network communication traffic because each web server maintains a copy of the current data, which may be used to generate multiple web pages before the data is updated. Thus, rather than downloading the data each time the data is required by the web server, the data is retrieved by the web server once and stored locally until the next data retrieval phase. This local storage of data reduces the time required by the web server to generate web pages.

A particular embodiment of the invention has been described and illustrated herein with reference to multiple web servers coupled to a common data server. However, the teachings of the present invention can be applied to any type of server or other computing device that requires periodic updates of data from another device, such as a data storage device.

Figure 7:
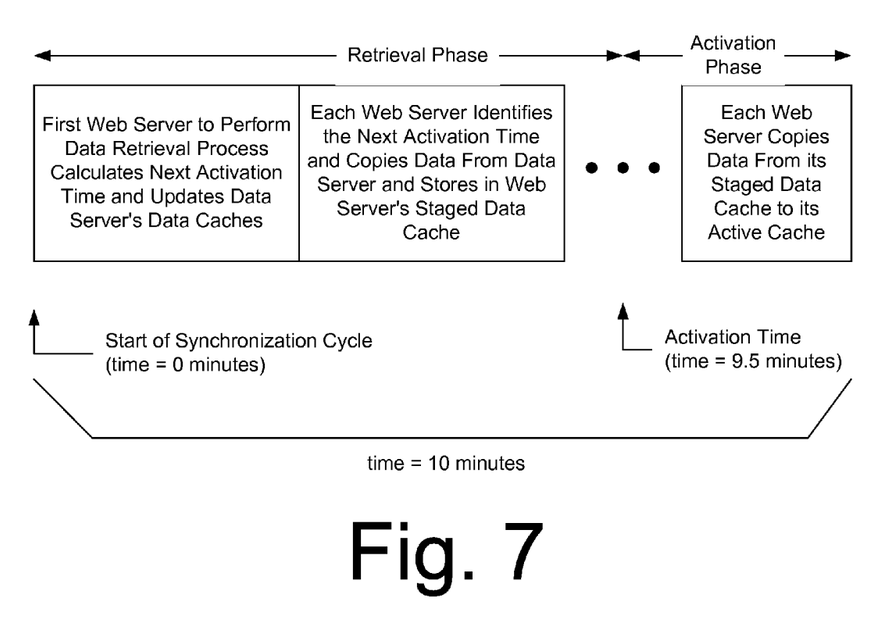
FIG. 7 is a time line illustrating an exemplary series of events for synchronizing data in multiple web servers using a common data server.

FIG. 7 is a time line illustrating an exemplary series of events for synchronizing data in multiple web servers using a common data server. FIG. 7 shows one complete synchronization cycle, starting on the left side of the time line and ending on the right side of the time line. The synchronization cycle starts with the retrieval phase and ends with the activation phase. The retrieval phase begins when the activation phase of the previous synchronization cycle terminates. In the retrieval phase, the first web server to perform the data retrieval process calculates the next activation time and updates the data server's data caches (i.e., copies data from the data server's staged data cache to the active data cache and from the production data cache to the staged data cache). Next, each of the remaining web servers identifies the next activation time (stored in the data server) and copies data from the data server's staged data cache into the web server's staged data cache. This retrieval of information by the web servers continues until all web servers have retrieved the updated data from the data server.

When all web servers have retrieved the updated data, no further data transfers occur until the activation phase begins, as determined by the activation time. Since each web server has retrieved the same activation time and has determined the time difference between its own clock and the clock of the data server, all web servers copy data from their staged data cache to their active cache at approximately the same time. After all web servers have copied data from their staged data cache to their active cache, the synchronization cycle is complete. The next synchronization cycle begins when the first web server initiates a data retrieval process.

In the particular example of FIG. 7, one synchronization cycle takes approximately ten minutes. The retrieval phase requires the first nine-and-a-half minutes of the synchronization cycle and the activation phase requires the remaining thirty seconds of the synchronization cycle. Other implementations of the invention may utilize synchronization cycle times greater than ten minutes or less than ten minutes depending on the amount of data retrieved by each web server, the number of web servers coupled to the data server, and the frequency with which the data in the data server is updated. As the amount of data retrieved by each web server increases, the time necessary to complete the retrieval phase also increases. As the number of web servers increases, the time required to perform the retrieval phase also increases. If data in the data server is updated infrequently, then the synchronization cycle time can be increased such that synchronizations are performed less frequently. The length of the synchronization cycle can be adjusted by changing the value of the synchronization interval, discussed above.

In the embodiments described above, the data in the staged data cache is always copied to the active data cache, regardless of whether the staged data is different from the active data. In an alternate embodiment, the staged data is copied to the active data cache only if the data has changed (i.e., the staged data is different from the active data). This alternate embodiment can be applied in both the web server and the data server. Similarly, the production data in the data server is copied to the staged data cache in the data server only if the data has changed. Further, the staged data in the data server is copied to the staged data cache in the web server only if the data has changed. This alternate embodiment can be implemented, for example, by using a flag or other indicator that is set or changed when data in a data cache is modified.

Thus, a system has been described that allows multiple web servers to maintain synchronized data without requiring the web servers to have knowledge of any other web servers. Each web server executes a common procedure that communicates with a data server to periodically retrieve updated data that is copied to a staging area in the web server. At a particular time, all web servers copy the staged data to an active data cache for use with all subsequent calculations and web pages generated by the web server. The caching of data locally on each web server allows fast retrieval of data from the cache, which increases the speed at which web pages are generated and displayed to a user.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method of synchronizing activation of scheduled update data among a plurality of web servers, wherein each of the plurality of web servers is coupled to a common data server, the method comprising:

Receiving, by a web server of the plurality of web servers, a scheduled activation time from the common data server;

Prior to the scheduled activation time, receiving the scheduled update data, the scheduled update data including data prospectively to be employed by the plurality of web servers in processing transactions, into the staging caches in each web server of the plurality of web servers; and At the scheduled activation time, activating the scheduled update data by causing the scheduled update data from the staging caches within each web server of the plurality of web servers to be accessible from an active cache within each web server of the plurality of web servers;

Wherein each web server of the plurality of web servers is further configured to adjust a scheduled activation time on the web server by a time difference between a clock in the web server and a clock in the common data server.

2. A method as recited in claim 1 wherein each web server contains a clock, and wherein the clocks in the plurality of web servers are not synchronized with one another.

3. A method as recited in claim 1 wherein the causing the scheduled update data to be accessible from the active cache comprises swapping an active data cache pointer with a staged data cache pointer.

4. A method as recited in claim 1 wherein no communications are required between the individual web servers to synchronize their data.

5. A method as recited in claim 1 wherein retrieving scheduled update data into staging caches in the plurality of web servers is performed asynchronously.

6. The method as recited in claim 1, further comprising: after the scheduled activation time, updating data caches in the common data server.

7. A method as recited in claim 1 further comprising: after the scheduled activation time, calculating a next scheduled activation time.

8. A method as recited in claim 1 further comprising: after the scheduled activation time, updating data caches in the common data server and calculating a next scheduled activation time, wherein the updating and calculating are performed by a first web server to initiate a retrieval process after the scheduled activation time.

9. A method as recited in claim 1 further comprising: if an additional web server is coupled to the common data server, then causing the scheduled update data to be accessible from the active cache in the common data server to an active cache in the additional web server.

10. A method as recited in claim 1 further comprising: if one of the plurality of web servers is initialized, then causing the scheduled update data to be accessible from the active cache in the common data server to the active cache in the initialized web server.

11. One or more computer-readable memories containing a computer program that is executable by a processor to perform the method recited in claim 1.

12. A system comprising:
a plurality of web servers coupled to a common data server, wherein each of the plurality of web servers comprises:
a staging cache;
an active data cache coupled to the staging cache;
wherein the web server of the plurality of web servers is configured to receive a scheduled activation time from the common data server, and further configured to receive scheduled update data, the scheduled update data including data prospectively to be employed by the plurality of web servers in processing transactions, from the common data server into the staging cache prior to the scheduled activation time; and
wherein the web server of the plurality of web servers is configured to cause the scheduled update data from the staging cache to be accessible from the active data cache at the scheduled activation time;
wherein each web server of the plurality of web servers is further configured to adjust a scheduled activation time on the web server by a time difference between a clock in the web server and a clock in the common data server.

13. A system as recited in claim 12 wherein each web server contains a clock, and wherein the clocks in the plurality of web servers are not synchronized with one another.

14. A system as recited in claim 12 wherein the web server is further configured to swap an active data cache pointer with a staged data cache pointer.

15. A system as recited in claim 12 wherein each of the plurality of web servers is configured to update data caches in the common data server after the scheduled activation time.

16. A system as recited in claim 12 wherein each of the plurality of web servers is configured to calculate a next scheduled activation time after the scheduled activation time.

17. One or more computer-readable media having stored thereon a computer program that when executed performs a method comprising the following steps:

Receiving, by a web server of the plurality of web servers, a scheduled activation time from the common data server;

Prior to the scheduled activation time, receiving scheduled update data into a staging cache in the web server, the scheduled update data including data prospectively to be employed by the plurality of web servers in processing transactions;

At the scheduled activation time, causing scheduled update data from the staging cache in the web server to be accessible from an active cache in the web server;

After the scheduled activation time, updating data caches in the common data server and calculating a next scheduled activation time;

Wherein the web server of the plurality of web servers is further configured to adjust a scheduled activation time on the web server by a time difference between a clock in the web server and a clock in the common data server.

18. One or more computer-readable media as recited in claim 17 wherein each server contains a clock, and wherein the clocks in the plurality of servers are not synchronized with one another.

19. One or more computer-readable media as recited in claim 17 wherein updating data caches in the common data server and calculating the next scheduled activation time are performed if another process has not yet updated the data caches or calculated the next scheduled activation time during a current data synchronization cycle.

* * * * *